(12) United States Patent
Potnis

(10) Patent No.: US 11,745,749 B2
(45) Date of Patent: Sep. 5, 2023

(54) VEHICULAR SYSTEM FOR TESTING PERFORMANCE OF OBJECT DETECTION ALGORITHMS

(71) Applicant: Magna Electronics Inc., Auburn Hills, MI (US)

(72) Inventor: Anuj S. Potnis, Hösbach (DE)

(73) Assignee: Magna Electronics Inc., Auburn Hills, MI (US)

( * ) Notice: Subject to any disclaimer, the term of this patent is extended or adjusted under 35 U.S.C. 154(b) by 420 days.

(21) Appl. No.: 17/247,878

(22) Filed: Dec. 29, 2020

(65) Prior Publication Data

US 2021/0201056 A1 Jul. 1, 2021

Related U.S. Application Data

(60) Provisional application No. 62/954,865, filed on Dec. 30, 2019.

(51) Int. Cl.
| | |
|---|---|
| *B60W 50/12* | (2012.01) |
| *B60W 60/00* | (2020.01) |
| *G06N 3/08* | (2023.01) |
| *G06V 20/58* | (2022.01) |
| *H04W 4/46* | (2018.01) |
| *H04W 4/38* | (2018.01) |
| *G01M 17/007* | (2006.01) |
| *B60W 50/04* | (2006.01) |

(Continued)

(52) U.S. Cl.
CPC ............ *B60W 50/04* (2013.01); *B60W 50/12* (2013.01); *G06F 18/214* (2023.01); *G06N 3/08* (2013.01); *G06V 10/774* (2022.01); *G06V 20/58* (2022.01); *H04W 4/46* (2018.02); *B60W 60/001* (2020.02); *B60W 2510/18* (2013.01)

(58) Field of Classification Search
None
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |

(Continued)

FOREIGN PATENT DOCUMENTS

| | | | | |
|---|---|---|---|---|
| CN | 104149728 A | * | 11/2014 | ............... B60T 7/22 |
| CN | 110001662 A | * | 7/2019 | ............ B60W 50/00 |
| DE | 102018206806 A1 | * | 10/2019 | ........... G06K 9/4628 |

*Primary Examiner* — Mohammed Rachedine
(74) *Attorney, Agent, or Firm* — HONIGMAN LLP

(57) ABSTRACT

A method for testing a vehicular driving assist system includes positioning the vehicle near a target object such that the target object is within a field of sensing of at least one sensor of the vehicle. The vehicle has an ECU having electronic circuitry and associated software, with the electronic circuitry of the ECU including a processor for processing data captured by the at least one sensor to detect presence of objects in the field of sensing of the at least one sensor. The vehicle is maneuvered away from the target object and, as the vehicle maneuvers away from the target object, the data captured by the at least one sensor is recorded. The recorded data is reversed to indicate the vehicle is approaching the target object. The reversed recorded data is provided as an input to the vehicular driving assist system to test the vehicular driving assist system.

22 Claims, 3 Drawing Sheets

(51) Int. Cl.
    *G06F 18/214*     (2023.01)
    *G06V 10/774*     (2022.01)

(56) References Cited

U.S. PATENT DOCUMENTS

| | | |
|---|---|---|
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 9,036,026 B2 | 5/2015 | Dellantoni et al. |
| 9,126,525 B2 | 9/2015 | Lynam et al. |
| 9,672,433 B2 * | 6/2017 | Nagata .................. G06V 20/58 |
| 9,900,490 B2 | 2/2018 | Ihlenburg et al. |
| 10,071,687 B2 | 9/2018 | Ihlenburg et al. |
| 10,793,147 B2 * | 10/2020 | Kaminade .............. B60Q 9/008 |
| 2016/0292519 A1 * | 10/2016 | Templeton ................ G06T 7/77 |
| 2019/0016331 A1 * | 1/2019 | Carlson ................ G05D 1/0088 |
| 2019/0016384 A1 * | 1/2019 | Carlson ................ G05D 1/0088 |
| 2019/0033865 A1 * | 1/2019 | Ewert .................... G06V 20/58 |

* cited by examiner

VEHICULAR SYSTEM FOR TESTING PERFORMANCE OF OBJECT DETECTION ALGORITHMS

CROSS REFERENCE TO RELATED APPLICATION

The present application claims the filing benefits of U.S. provisional application Ser. No. 62/954,865, filed Dec. 30, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras or other sensors at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a method for testing a driving assistance system or vision system or imaging system for a vehicle that utilizes one or more sensors to capture sensor data representative of data exterior of the vehicle. The method includes positioning the vehicle near a target object, with the target object being within the field of sensing of at least one sensor of the vehicle. The method also includes maneuvering the vehicle away from the target object and, as the vehicle maneuvers away from the target object, recording the data captured by the at least one sensor. The method also includes temporally reversing order of the recorded data. The reversed order recorded data indicates to the system under test that the vehicle is approaching the target object. The method also includes providing the reversed order recorded data to the driving assist system to test the driving assist system.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture data exterior of the vehicle and may process the captured data to detect objects at or near the vehicle and in the predicted path of the vehicle, such as to assist a driver of the vehicle in maneuvering the vehicle in a rearward direction. The driver assist system includes a processor or processing system that is operable to receive data from one or more sensors (e.g., cameras).

Figure 1:
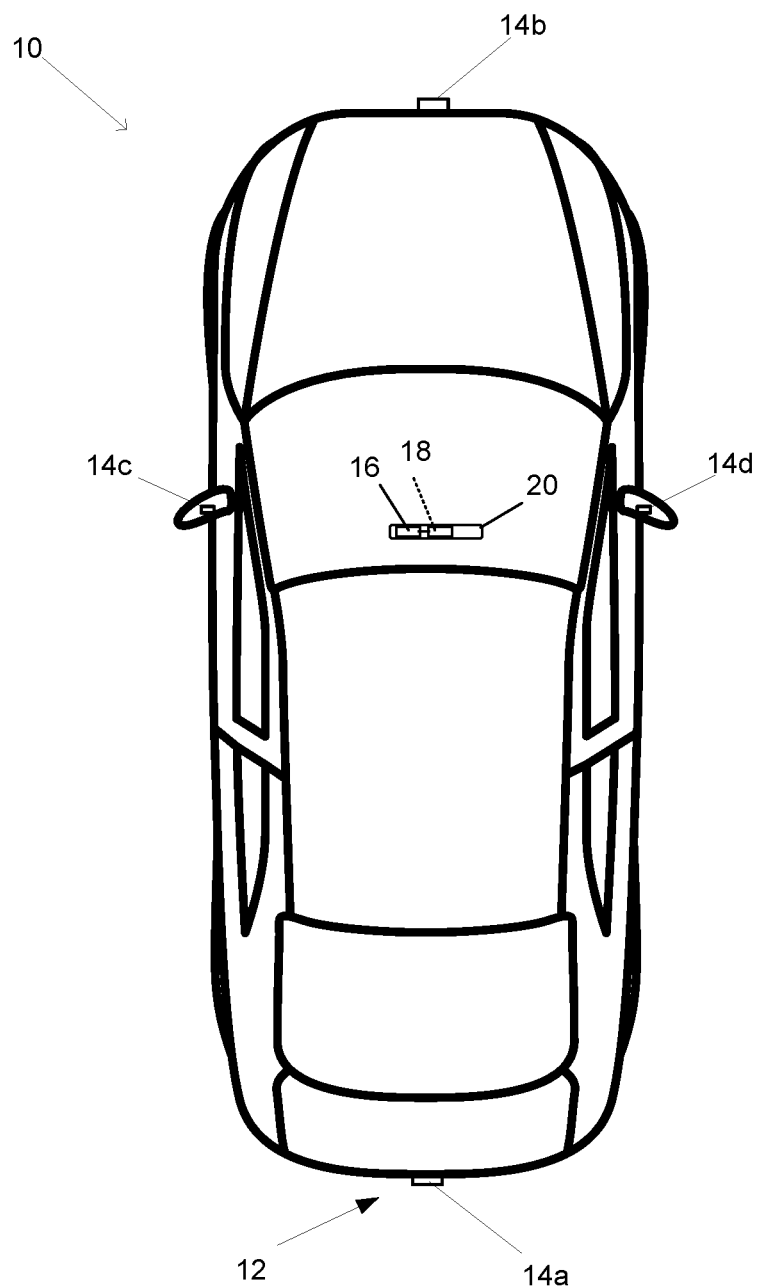
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and sideward/rearward viewing cameras 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the ECU and/or the display device may be disposed elsewhere at or in the vehicle). The data transfer or signal communication from the camera to the ECU may comprise any suitable data or communication link, such as a vehicle network bus or the like of the equipped vehicle.

Vehicles often make use of an imaging system (e.g., a camera system) to detect and/or recognize objects (e.g., vehicles and vulnerable road users such as pedestrians and cyclists). The vehicular vision system may determine an object type and object position. The object type and position may be used by various advanced driver-assistance system (ADAS) modules, e.g., Autonomous Emergency Braking (AEB) and or autonomous vehicle control. Generally, there are two broad ways to test the performance of such vehicular vision systems: on public roads and on test tracks.

On public roads, a host vehicle drives and collects data in different countries, road types, lighting conditions, weather conditions, traffic situations, etc. The host vehicle drives exactly as any other vehicle would drive on a public road, i.e., the vehicle will not drive in a way that is dangerous and will obey all local traffic regulations. In this example, the ADAS modules are open loop. That is, the ADAS modules under test will not maneuver the host vehicle in any way (e.g., apply brakes or steering).

On test tracks, the host vehicle follows a suite of test cases specified by the developer, the original equipment manufacturer (OEM), the European New Car Assessment Programme (EURO NCAP), safety regulations, etc. These are development or safety tests in which the host vehicle approaches the target objects at varying speeds, angles and can often result in collision with the target object. The ADAS modules under test may be closed loop. That is, the ADAS modules may maneuver the host vehicle (e.g., apply brakes or steering). Alternatively, the ADAS modules may also be open loop. Due to the dangerous nature of testing, the target objects are generally dummies. For example, the target objects may be a specially designed pedestrian with motorized limbs to replicate the motion of a walking pedestrian. Another example target object is a balloon vehicle. Because dummies are used for testing, there is no way to prove that the vehicular vision system under test will perform equally well in real-world driving.

Figure 2:
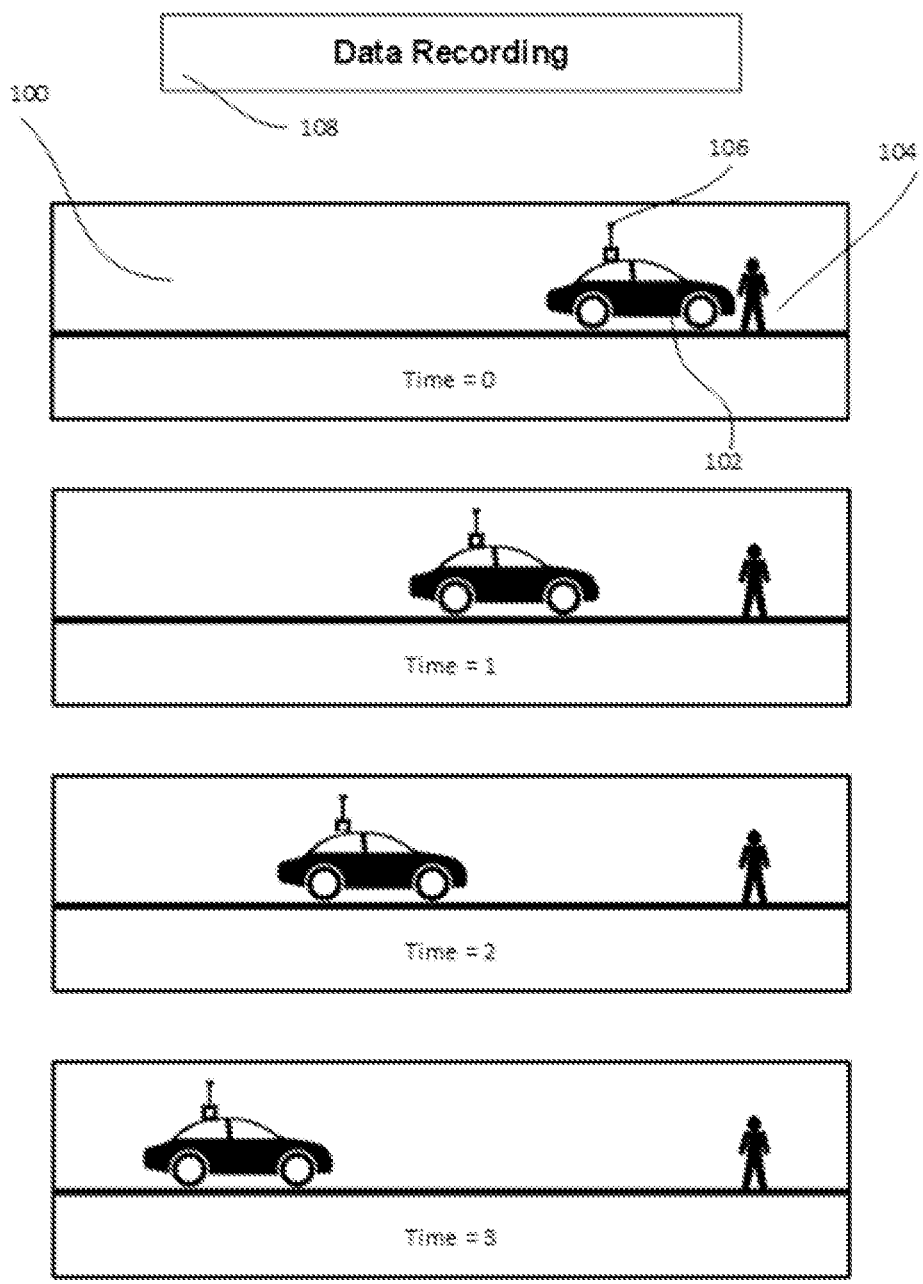
FIG. 2 is a schematic view of recording data of a vehicle maneuvering away from a target object in accordance with the present invention.

In accordance with an aspect of the present invention, a vehicular vision system test system uses a real object as a target without possibility of any damage/injury to either the target or the vehicle. The host vehicle begins a test by touching (or being near to) a target (such as by starting the test process with the vehicle at or near or touching the target). The target may, for example, be an actual pedestrian. Referring now to FIG. 2, a host vehicle 102 at a test facility 100 drives away from a target 104 (e.g., in the reverse gear) so that the vehicle 102 moves away from the target 104. At all times, the position of the host vehicle 102 with respect to time may be tracked using an accurate GPS sensor 106 or similar system. The test system may record data 108 captured by at least one sensor of the vehicle (e.g., a camera). In the example shown in FIG. 2, the vehicle 102, at time=0, is at or near the target 104. At time t=1, the vehicle 102 has reversed a distance away from the target 104. Similarly at time=2, the vehicle 102 has reversed a further distance from the target 104 and at time=3, the vehicle 102 has reversed an even further distance from the target 104.

Figure 3:
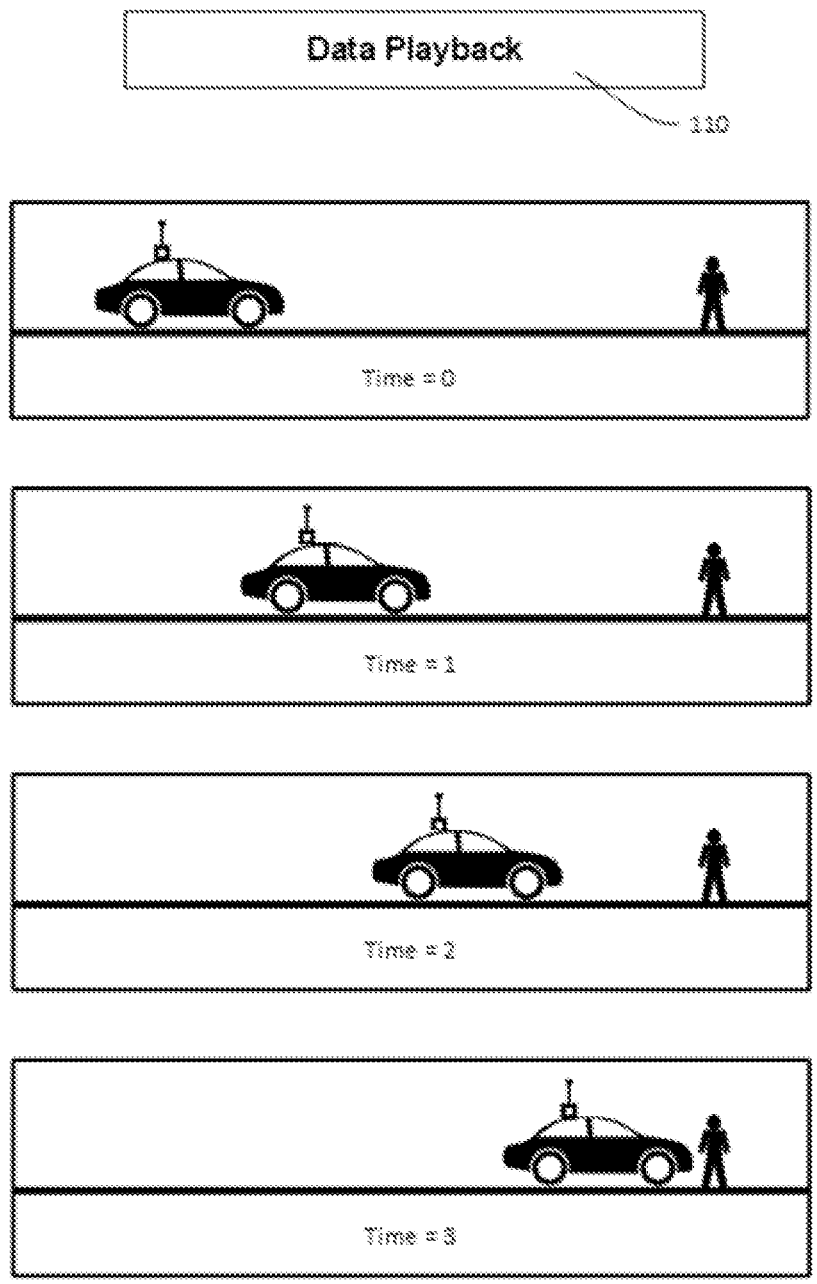
FIG. 3 is a schematic view of reversing the data recorded in FIG. 2 in accordance with the present invention.

The test system may use the recorded data and intelligently, as discussed in more detail below, reverse the order of the data (e.g., a video) and feed the reversed recorded data 110 into the vehicular vision system under test. Put another way, a video is provided to the vehicular vision system under test in reverse order, and the vehicular vision system performs its function (e.g., executes appropriate algorithms) using the reversed video 110. Thus, it appears to the vehicular vision system under test, via the reversed video, that the target is approaching the host vehicle. In the example shown in FIG. 3, the reverse of FIG. 2 is illustrated. That is, at time=0, the vehicle is at the same position as at time=3 in FIG. 2, and at time=3 in FIG. 3, the vehicle is in the same position as at time=0 in FIG. 2 (i.e., near the target object).

The test system may simply reverse the video and provide the reversed video image data 110 as an input to the system. Optionally, the system may perform a variety of additional tasks, such as manipulate the original frame rate of the video, interpolate in between image frames, etc. The test system receives simulated vehicle signals (e.g., speed, acceleration/deceleration, braking, etc.) or a test sequence, and uses this information to playback the video such that the video visually appears to the system under test as if the host vehicle is approaching the target at the simulated speed and acceleration. Optionally, interpolation of the video frames may be accomplished using traditional approaches or using sophisticated artificial intelligence approaches, e.g., generative adversarial networks. Artificial intelligent techniques may model some effects (e.g., motion blur) of high-speed videos more accurately than traditional methods.

Simulation software may generate simulated vehicle signals based on a test case. For example, one test case may include the host vehicle approaching the target object at 30 km/h and performing emergency braking when the distance between the vehicle and the target is less than 20 m. The simulation software may generate a variety of signals such as a vehicle speed signal (i.e., vehicle velocity), brake signal, vehicle acceleration, vehicle pitch, vehicle yaw, vehicle roll, etc. The simulated signals and the interpolated or upsampled and reversed video may be fed to an Intelligent Module. The Intelligent Module may intelligently select video frames from the upsampled video to generate a final video which will play at the same frame rate as the original video. However, the reversed video will visually appear as if the host vehicle approaches the target object at 30 km/h and brakes (i.e., decelerates) when 20 m away from the target object (as opposed to driving away from the target in the original video).

The test system may also alter the video (e.g., offset the video vertically or horizontally) to simulate the pitch when performing emergency braking. The system may alter the video using traditional computer vision techniques (for example determining the pitch from a vehicle sensor) or using artificial intelligence techniques. When using artificial intelligence techniques, a calibration checker pattern may be setup and the host vehicle may approach the calibration checker pattern and perform emergency braking at different speeds and distances. The system may then be trained using artificial intelligence techniques and data gathered (e.g., via the camera or pitch sensor) during the emergency braking. When the artificial intelligence (e.g., a neural network) is presented with a real video and the corresponding speed and braking, the system may simulate the pitch by altering the images as trained by the calibration checker pattern.

The test system may test a variety of driving assist systems and corresponding sensors. For example, the test system may record data from a camera, a radar sensor, or an ultrasonic sensor.

Typically autonomous vehicle control would be responsive to a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for testing a vehicular driving assist system, the method comprising:
    positioning a vehicle near a target object such that the target object is within a field of sensing of at least one sensor of the vehicle;
    wherein the vehicle is equipped with a vehicular driving assist system comprising an electronic control unit (ECU) having electronic circuitry and associated software, and wherein the electronic circuitry of the ECU comprises a processor for processing data captured by the at least one sensor to detect presence of objects in the field of sensing of the at least one sensor;
    maneuvering the vehicle away from the target object while maintaining the target object within the field of sensing of the at least one sensor;
    as the vehicle maneuvers away from the target object, capturing data via the at least one sensor and recording the data captured by the at least one sensor;
    after the vehicle maneuver is complete, reversing order of the recorded data captured by the at least one sensor, wherein the reversed order recorded data represents the vehicle as approaching the target object; and
    providing the reversed order recorded data as an input to the vehicular driving assist system to test the vehicular driving assist system.

2. The method of claim 1, wherein the at least one sensor comprises a camera.

3. The method of claim 2, wherein the camera comprises a forward viewing camera, and wherein maneuvering the vehicle away from the target object comprises reversing the vehicle away from the target object.

4. The method of claim 1, further comprising tracking a position of the vehicle relative to the target object as the vehicle maneuvers away from the target object.

5. The method of claim 4, wherein the vehicle is tracked using a GPS sensor disposed at the vehicle.

6. The method of claim 1, further comprising interpolating the reversed order recorded data.

7. The method of claim 1, further comprising simulating at least one vehicle signal and providing the simulated at least one vehicle signal to the vehicular driving assist system.

8. The method of claim 7, wherein the at least one vehicle signal comprises at least one selected from the group consisting of (i) a vehicle speed signal and (ii) a vehicle braking signal.

9. The method of claim 7, wherein the simulated at least one vehicle signal is simulated using a neural network.

10. The method of claim 9, wherein the neural network comprises a generative adversarial network.

11. The method of claim 1, further comprising vertically offsetting the reversed order recorded data to simulate pitch of the at least one sensor during braking of the vehicle.

12. The method of claim 11, wherein a neural network offsets the reversed order recorded data.

13. The method of claim 12, further comprising training the neural network using a calibration checker pattern.

14. A method for testing a vehicular driving assist system, the method comprising:

positioning a vehicle near a target object such that the target object is within a field of view of at least one camera of the vehicle;

wherein the vehicle is equipped with a vehicular driving assist system comprising an electronic control unit (ECU) having electronic circuitry and associated software, and wherein the electronic circuitry of the ECU comprises a processor for processing image data captured by the at least one camera to detect presence of objects in the field of view of the at least one camera;

maneuvering the vehicle away from the target object while maintaining the target object within the field of view of the at least one camera;

as the vehicle maneuvers away from the target object, capturing image data via the at least one camera and recording the image data captured by the at least one camera;

after the vehicle maneuver is complete, reversing order of the recorded image data captured by the at least one camera, wherein the reversed order recorded image data represents the vehicle as approaching the target object;

simulating at least one vehicle signal; and providing the reversed order recorded image data and the simulated at least one vehicle signal as inputs to the vehicular driving assist system to test the vehicular driving assist system.

15. The method of claim 14, wherein the at least one camera comprises a forward viewing camera, and wherein maneuvering the vehicle away from the target object comprises reversing the vehicle away from the target object.

16. The method of claim 14, further comprising tracking a position of the vehicle relative to the target object as the vehicle maneuvers away from the target object.

17. The method of claim 16, wherein the vehicle is tracked using a GPS sensor disposed at the vehicle.

18. The method of claim 14, wherein the at least one vehicle signal comprises at least one selected from the group consisting of (i) a vehicle speed signal and (ii) a vehicle braking signal.

19. A method for testing a vehicular driving assist system, the method comprising:

positioning a vehicle near a target object such that the target object is within a field of sensing of at least one sensor of the vehicle;

wherein the vehicle is equipped with a vehicular driving assist system comprising an electronic control unit (ECU) having electronic circuitry and associated software, and wherein the electronic circuitry of the ECU comprises a processor for processing data captured by the at least one sensor to detect presence of objects in the field of sensing of the at least one sensor;

maneuvering the vehicle away from the target object while maintaining the target object within the field of sensing of the at least one sensor;

as the vehicle maneuvers away from the target object, capturing data via the at least one sensor and recording the data captured by the at least one sensor;

as the vehicle maneuvers away from the target object, tracking a position of the vehicle relative to the target object as the vehicle maneuvers away from the target object using a GPS sensor disposed at the vehicle;

after the vehicle maneuver is complete, reversing order of the recorded data captured by the at least one sensor, wherein the reversed order recorded data represents the vehicle as approaching the target object;

interpolating the reversed recorded data; and providing the interpolated reversed order recorded data as an input to the vehicular driving assist system to test the vehicular driving assist system.

20. The method of claim 19, further comprising simulating at least one vehicle signal and providing the simulated at least one vehicle signal to the vehicular driving assist system.

21. The method of claim 20, wherein the simulated at least one vehicle signal is simulated using a neural network.

22. The method of claim 20, wherein the at least one vehicle signal comprises at least one selected from the group consisting of (i) a vehicle speed signal and (ii) a vehicle braking signal.

* * * * *